United States Patent [19]

Jones

[11] Patent Number: 4,801,939
[45] Date of Patent: Jan. 31, 1989

[54] HIGH-SPEED DATA COMPRESSOR/DECOMPRESSOR FOR SYNTHETIC APERTURE RADAR

[75] Inventor: Robert V. Jones, Bountiful, Utah

[73] Assignee: Unisys Corporation, Blue Bell, Pa.

[21] Appl. No.: 93,328

[22] Filed: Sep. 4, 1987

[51] Int. Cl.$^4$ .............................. G01S 7/38
[52] U.S. Cl. .................... 342/25; 342/58; 342/194; 342/195
[58] Field of Search ............... 342/25, 58, 194, 195

[56] References Cited

U.S. PATENT DOCUMENTS

| | | |
|---|---|---|
| 2,897,490 | 7/1959 | Sunstein . |
| 3,201,787 | 8/1965 | Grewe et al. . |
| 3,680,103 | 7/1972 | Houser et al. . |
| 3,885,224 | 5/1975 | Klahr . |
| 4,005,423 | 1/1977 | Webb . |
| 4,075,630 | 2/1978 | Shapiro et al. . |
| 4,471,357 | 9/1984 | Wu et al. . |
| 4,616,227 | 10/1986 | Homma et al. . |

Primary Examiner—T. H. Tubbesing
Assistant Examiner—Mark Hellner
Attorney, Agent, or Firm—John B. Sowell; Kevin R. Peterson; Thomas J. Scott

[57] ABSTRACT

Apparatus is provided for compressing unfocused synthetic aperture radar (SAR) phase history pixel data by coupling the complex inphase phase history data output from the SAR to a first converter/compressor which produces compressed scalar log amplitude data and scalar phase pixel data. The output from the first converter/compressor is applied to a series to parallel converting means for converting plural scaler pixel data into vector data representative of a plurality of pixels. The output of the series to parallel conversion means is coupled to a second converter/compressor for converting the plural scalar pixel data into compressed encoded data representative of a plurality of pixels of unfocused SAR phase history data which is transmitted as compressed unfocused phase history data.

18 Claims, 4 Drawing Sheets

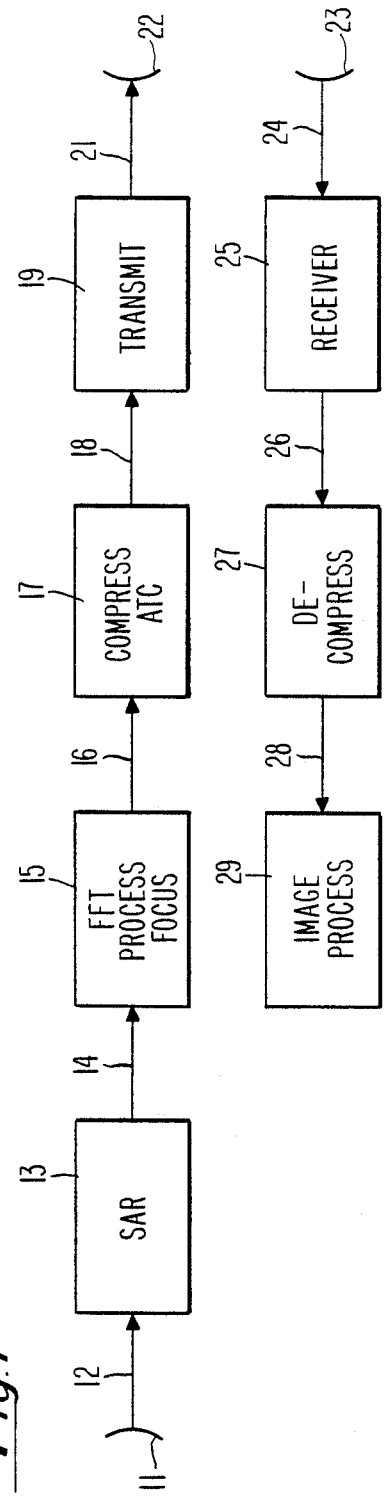
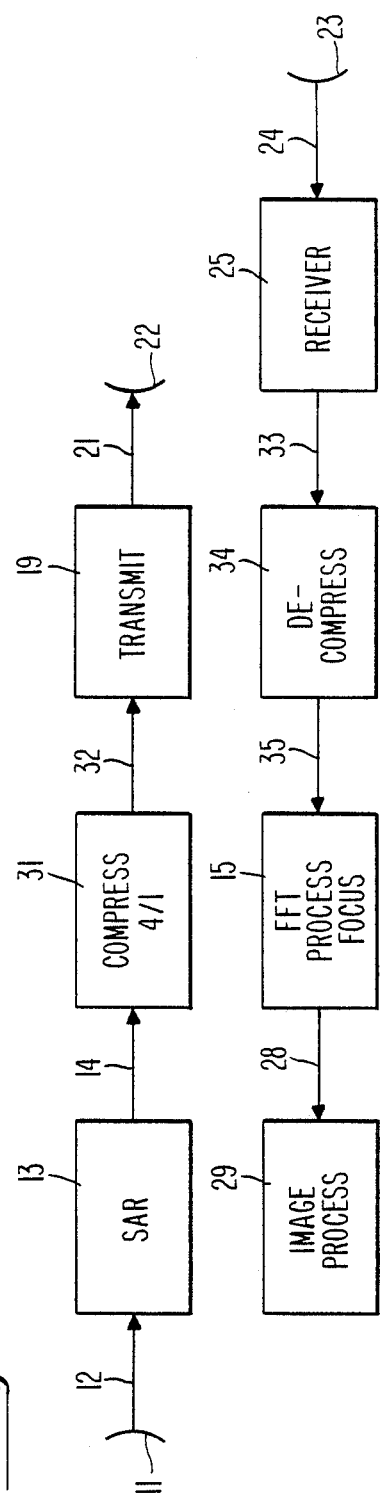

HIGH-SPEED DATA COMPRESSOR/DECOMPRESSOR FOR SYNTHETIC APERTURE RADAR

BACKGROUND OF THE INVENTION

1. Field of the Invention

This invention relates to apparatus and a method for compressing unprocessed phase history synthetic aperture radar (SAR) digital data information for transmission by wide band data links and for decompressing the transmitted compressed digital information. More specifically, the present invention relates to a new method and hardware apparatus for compressing unfocused phase history SAR data which was heretofore incompressible for reasons to be discussed hereinafter.

2. Description of the Prior Art

Unprocessed SAR data has been transmitted to ground stations where the data is processed into enhanced images. It has been suggested that the bandwidth of the transmitted signal could be reduced by compressing the data to be transmitted to the ground station. However, if prior art data compression techniques were employed it would be necessary to convert the unfocused SAR phase history data into processed focus phase history data in order to compress the data by conventional transform techniques.

The digital data output from conventional SAR devices produces unfocused compressed phase history data which heretofore has ben incapable of being compressed by conventional transform techniques. If special fast fourier transform (FFT) techniques were employed to focus the unfocused phase history data at the airborne station, heavy complex equipment would be required. The weight of the FFT processing apparatus and the conventional transform data compression apparatus presently employed in ground stations is so large and so heavy that it cannot be presently incorporated into aircraft or satellite stations.

It would be extremely desirable to provide a simple and lightweight circuit apparatus and method which would permit direct data compression of SAR digital unfocused phase history pixel data.

SUMMARY OF THE INVENTION

It is the principal object of the present invention to provide an apparatus and a method of compressing unfocused SAR digital phase history data.

It is another principal object of the present invention to provide a simplified and lightweight airborne apparatus for incorporation into existing aircraft and satellite stations for compressing unfocused SAR digital phase history data.

It is yet another principal object of the present invention to provide a highly simplified decompressor for decompressing transmitted compressed unfocused SAR digital phase history data.

It is a general object of the present invention to provide an apparatus and method for compressing unfocused SAR digital phase history data which preserves the image quality of the transmitted data.

It is another general object of the present invention to provide an apparatus and method for compressing SAR digital phase history data by a factor of four-to-one without degrading the image quality of the transmitted data.

It is yet another general object of the present invention to provide apparatus for compressing SAR digital phase history data to provide a reduced bandwidth which results in a more reliable and simplified data link as well as providing a data link which is less vulnerable to jamming or other types of interference signals.

It is a general object of the present invention to provide a compressor for SAR digital phase history data which permits transmission of more data over the same data link bandwidth.

According to these and other objects of the present invention there is provided a high-sped lightweight apparatus for compressing unfocused SAR digital phase history data comprising a first converter for compressing and converting inphase and quadrature digital data into scalar log amplitude data and phase data defining individual pixels. The output of the compressor converter is coupled to apparatus for converting scalar log amplitude data pixels and phase data pixels into combined log amplitude vector data and into combined phase vector data defining a plurality of data pixels, and apparatus for simultaneously compressing and converting said vector data into encoded data for transmission which provides information representative of said inphase and quadrature digital data without the necessity of converting the unfocused SAR digital phase history date into focused images before transmission of the data.

BRIEF DESCRIPTION OF THE DRAWING

FIG. 1 is a schematic block diagram showing apparatus for compressing focused image data employing state of the art data compression techniques;

FIG. 2 is a schematic block diagram showing apparatus for compressing unfocused phase history data employing a novel compressor;

DESCRIPTION OF THE PREFERRED EMBODIMENT

Figure 3:
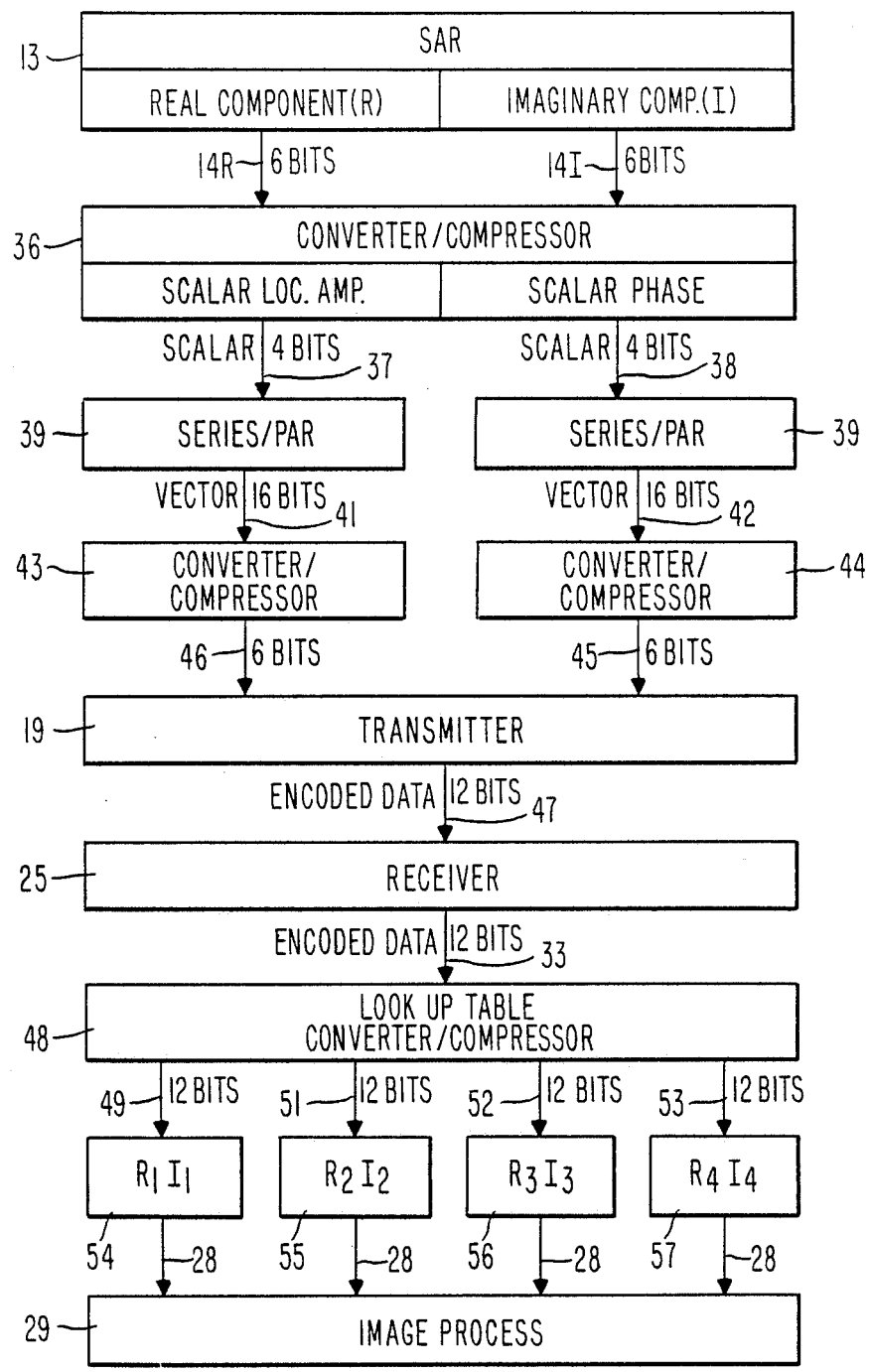
FIG. 3 is a schematic block diagram showing the process steps for compressing unfocused phase history data and for transmitting and decompressing the transmitted unfocused phase history data.

Refer now to FIG. 1 showing in block diagram form, apparatus for compressing focused image data and for describing the state of the art problem which exists. A radar antenna 11 is shown coupled to a synthetic aperture radar (SAR) digital receiver 13 via line 12. The digital complex phase history signal output on line 14 is unfocused and requires processing and/or filtering in order to generate a focused image. In the prior art, a fast fourier transform process is applied to the signal on line 14 at block 15 in order to produce a focused signal on line 16 which is capable of being compressed by adaptive transform coding or similar transform coding at block 17. The compressed signal on line 18 is then transmitted via transmitter 19, line 21 and transmitting antenna 22 as a compressed digital signal. The compressed digital signal is received at antenna 23 and connected via line 24 to receiver 25 which processes the signal and applies the received compressed signal via line 26 to the decompressor 27 which produces a focused decompressed signal on line 28 similar to the signal on line 16 which may now be processed into an image by image processor 29.

It will be noted that in the present state of technology, the equipment required to accomplish the fast fourier transform focusing at block 15 and the compression of the focused image signal on line 16 at block 17 requires costly and bulky equipment which in the present state of technology cannot be properly packaged for satellite and airborne implementation. Thus, there is no known airborne system for compression of SAR digital complex phase history data employing fast fourier transform and adaptive transform coding.

Refer now to FIG. 2 showing a schematic diagram of a system capable of compressing unfocused phase history data. The elements and components of FIG. 2 which are the same or substantially the same as those in FIG. 1 are numbered the same to illustrate the similarities between the two systems. The signal from radar antenna 11 on line 12 is applied to SAR 13 to produce the digital complex phase history data on line 14 which is compressed in the present invention novel compressor 31 to produce a compressed phase history data signal on line 32 which is now transmitted via transmitter 19, antenna 22 and line 21 to the receiving antenna 23. The signal on line 24 is processed in receiver 25 to produce a compressed phase history data signal on line 33 which is decompressed in the present invention decompressor 34 to produce a digital compressed phase history data signal on line 35 which is a replica of the data signal on line 14. The unfocused digital compressed phase history data signal on line 35 is processed in the fast fourier transform processer 15 to focus the image and produce a focused image signal on line 28 which is applied to the image processor 29 which can analyze the signal and produce a visual output.

If the novel compressor 31 and decompressor 34 are removed from the FIG. 2 embodiment, then the transmitted signal from the airborne station at antenna 22 is not compressed and the signal received at antenna 23 is the uncompressed phase history data signal which may be processed and focused at the fast fourier transform processing block 15 to produce a focus signal on line 28 which may be processed by image processor 29. The advantage of providing the novel lightweight and simple compressor 31 in the airborne station is that the bandwidth may be reduced for the same amount of data or more data may be transmitted on the same channel. If a narrow bandwidth is used, the link margin is increased and the transmitted signal is less susceptible to jamming and interference signals.

Refer now to FIG. 3 showing in schematic block diagram form the process of compressing unfocused phase history data and for decompressing the transmitted compressed unfocused phase history data. The SAR digital receiver 13 produces a real component on line 14R and an imaginary component on line 14I which is applied to the present invention converter/compressor 36 or to produce a scalar log amplitude signal on line 37 and a scalar phase signal on line 38. Compressor converter 36 performs a modified log amplitude phase compression of the SAR data signal on lines 14R and 14I. The six bit real and imaginary components at the input to converter/compressor 36 are converted to amplitude and phase digital signals and the modified log of the amplitude signal is taken. The modified log includes an offset and scaling factor which permits all of the values to be represented by four bits. It was found that most of the pixel magnitude values were in the lower range of magnitudes and by using a modified log approach, these values are preserved and separated as distinct values. The magnitude of each pixel may be represented by a magnitude M where M square is equal to I square plus R square. It will be noted that the input six bits are converted to four bits on lines 37 and 38, thus the compression factor is by a ratio of three to two.

The scalar values on lines 37 and 38 are applied to series to parallel converters 39 to produce and amplitude vector on line 41 and a phase vector on line 42 representative of amplitude and phase of a plurality of combined pixels. The 16 bit amplitude vector data on line 41 is applied to a converter/compressor 43 which quantizes the log amplitude vector information and the 16 bit phase vector information on line 42 is applied to a similar converter/compressor 44 which performs a vector quantization on the input signal to produce a compressed phase vector data signal on line 45 similar to the compressed log amplitude vector data on line 46. It will be noted that the signal on lines 45 and 46 is the same signal which occurs in FIG. 2 at line 32. Further, it will be noted that converter/compressors 43 and 44 have compressed the vector data information by a ratio of 8 to 3, thus, the total compression ratio of the signal on lines 14 to lines 45 and 46 (the same as line 32) is a ratio of 4 to 1 because the compressed signals on lines 45 and 46 is representative of four combined pixels. The signal input to transmitter 19 is shown connected by line 47 to the receiver 25 as explained hereinbefore. The receiver 25 produces an output signal signal on line 33 which is applied to the decompressor/converter 48 which comprises a look-up table as will be explained hereinafter which dequantizes the compressed phase history data on line 33. Since the information on line 33 is representative of four pixels, the look-up table-decompressor/converter 48 produces and output signal on lines 49, 51-53 representative of the four combined pixels of data. The information is preferably stored in buffer registers 54-57 and the information is sequentially read out to produce the necessary pixel information on line 28 which is applied to the image processor 29 to produce the aforementioned image information.

Figure 4:
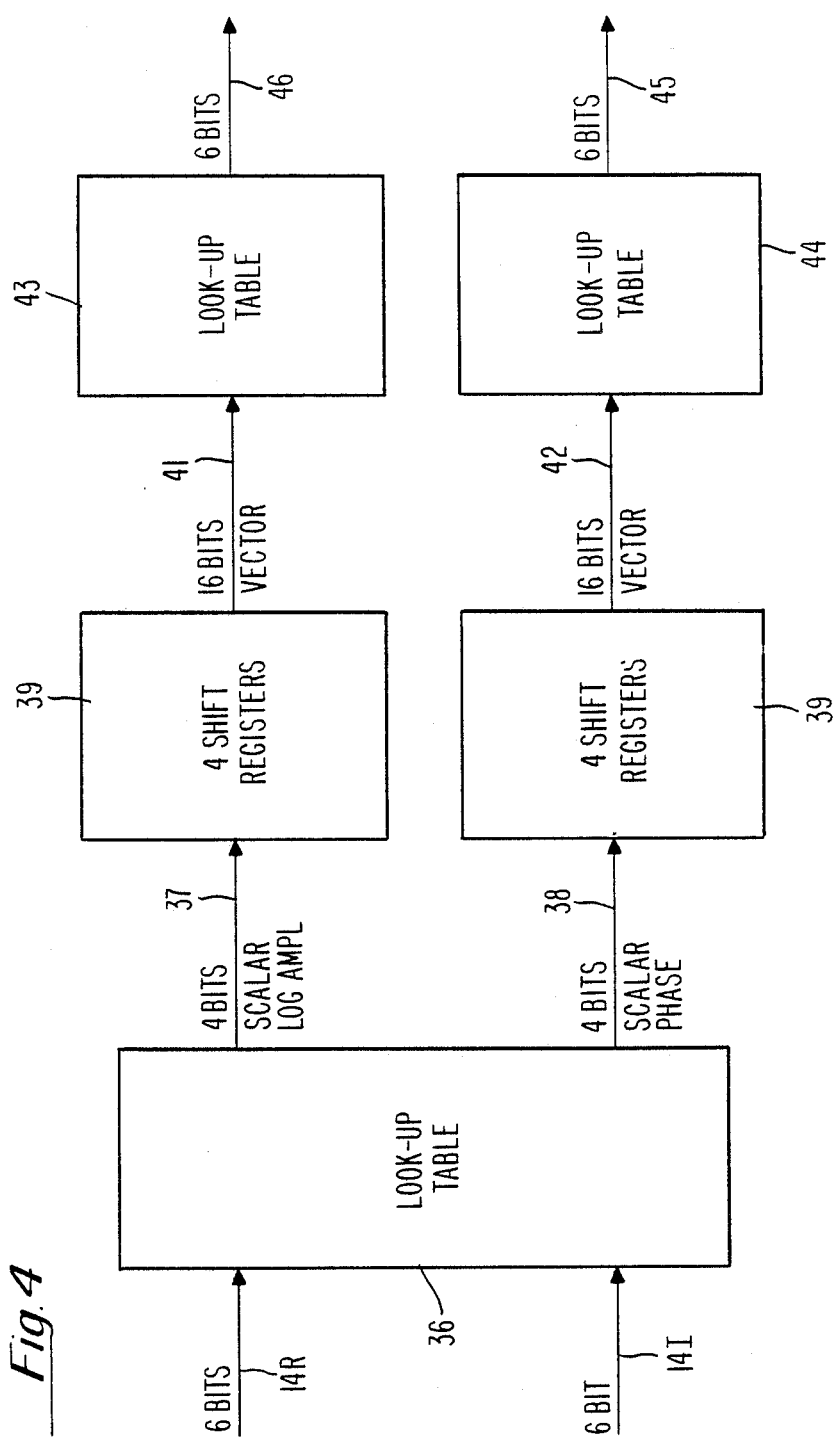
FIG. 4 is a schematic block diagram showing a preferred embodiment apparatus for compressing unfocused phase history data.

Refer now to FIG. 4 showing in schematic diagram form a preferred embodiment apparatus for compressing unfocused SAR phase history data on line 14 of FIGS. 1-3. The sixbit phase history information on lines 14R and 14I are representative of the unfocused phase history data information which is being produced at the output of the SAR receiver 13. This digital information is applied to look-up table 36 as an address to access precomputed and stored information representing the modified log amplitude data on line 37 and the phase data on line 38. The 6-bit phase history is quantized to 4-bits and is representative of a scalar value in digital form. Stated differently, the 4-bit serial output information on lines 37 and 38 is compressed scalar data representative of one pixel. The modified log amplitude information on line 37 is applied to four shift registers 39, which will be described in more detail hereinafter, to produce the modified log amplitude vector information on line 41. The four bits of scalar information on line 38 is applied to four shift registers 39 as will be explained hereinafter, to produce the scalar phase vector information on line 42. Since data representative of four pixels is being combined into one vector, the four bits on line 38 must be assimilated by series to parallel conversion in order to produce the vector information on lines 41 and 42. The scalar vector information on lines 41 and 42 is applied as an address to look-up tables 43 and 44 to produce compressed log amplitude vector information on line 46 and compressed phase vector information on line 45. It will be understood that the look-up tables 36, 43 and 44 are preferably commercially available ROMs because the information is not going to be changed but could be stored in a random access memory.

Figure 5:
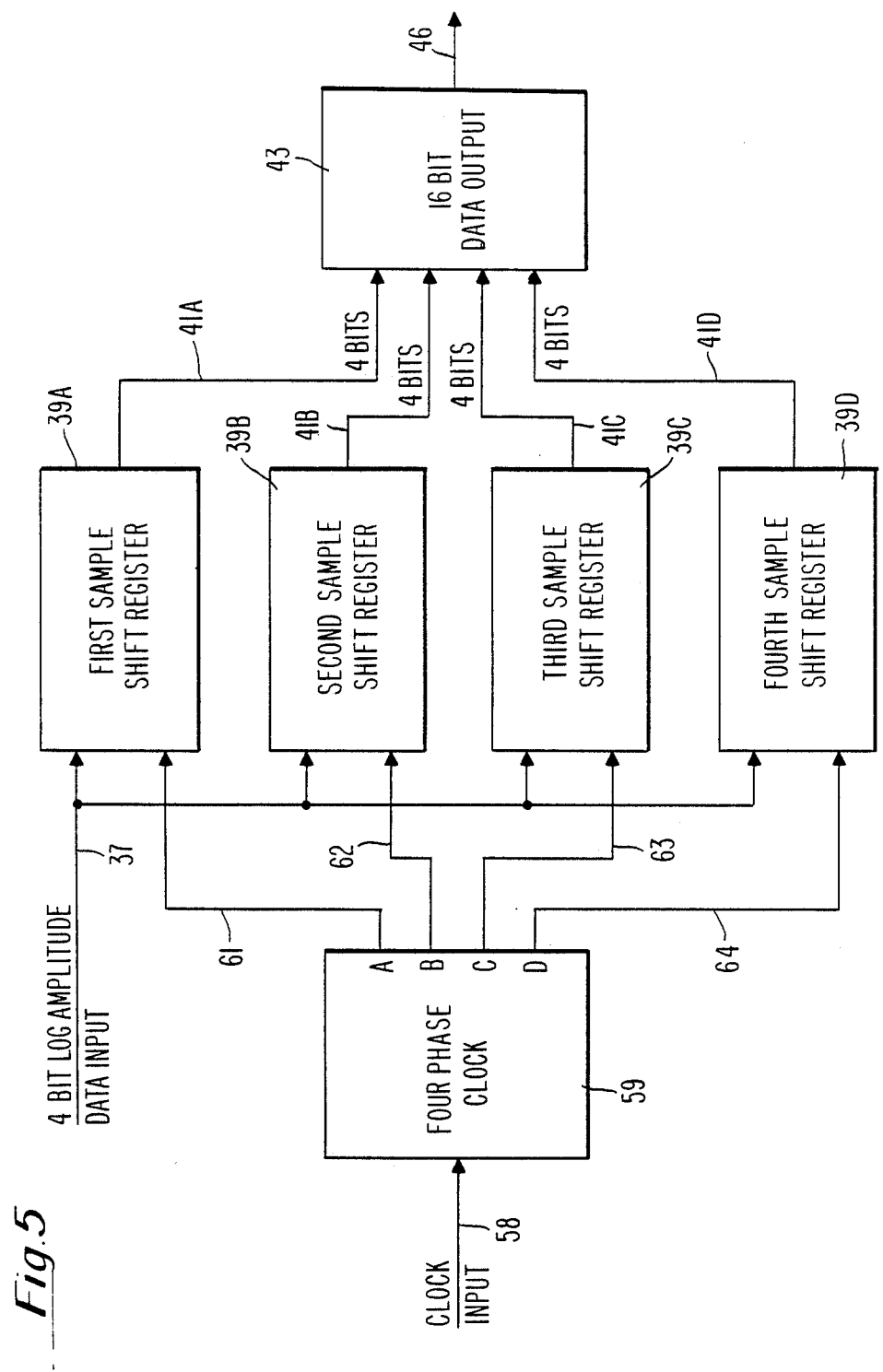
FIG. 5 is a schematic block diagram of a preferred embodiment apparatus for converting scalar pixel data to vector pixel data.

Refer now to FIG. 5 showing a more detailed schematic block diagram of the apparatus of FIG. 4 employed for series to parallel conversion and for converting scalar pixel data to combined vector pixel data. A master clock (not shown) is employed to produce a signal on clock input line 58 to a four phase clock 59 which produces phase signals A to D on lines 61 to 64 which are applied to the shift registers 39A to 39D respectively. The four bit log amplitude data input on line 37 is also sequentially applied to the four shift registers 39A to 39D. After four of the four bits are clocked into the respective shift registers 39A to 39D the 16-bit information is available in parallel form on output lines 41A to 41D as parallel vector information which is applied to the 12-bit look-up table 43 to produce the compressed log amplitude vector data on line 46. Similarly, a set of four shift registers 39 are employed for the phase data on line 38 as shown in FIG. 4 to produce the compressed phase vector data on line 45 as explained hereinbefore with regards to FIGS. 3 and 4.

Having explained a preferred embodiment serial to parallel converter 39 employing shift registers and phase clock signals, it will be understood that the same result may be accomplished employing a time multiplexer in combination with a RAM or latch or a first-in-first-out device which is now commercially available or similar devices for performing series to parallel conversion. In the preferred embodiment, a shift register implementation was selected because the structure is deemed to be faster and more reliable at high speeds.

Having explained a method and a preferred embodiment apparatus for compressing unfocused phase history data information, it will be understood that it is not necessary to precompute the information stored in the look-up tables 36, 43, 44 and 48. It is possible to program a high-speed computer with the necessary algorithm or program to produce the information and to produce the required look-up information during real time. The advantage of employing look-up tables for converter/compressors and decompressor/converters is that you may implement the present invention with state of the art hardware which is lightweight and may be incorporated into satellite and airborne equipment without weight penalties. Further, the look-up table implementation explained hereinbefore can be produced in low power CMOS technology which further reduces the power requirements. As explained hereinbefore, the same result may be achieved by employing computing devices, but this would require high-speed computers and/or special development of high-speed gate arrays which are not presently available.

A feature of the present invention is that the present embodiment invention may be incorporated into existing systems by modification thereof, and does not require redesign of the systems or allowance for penalty of special packaging.

What is claimed is:

1. A method of compressing unfocused synthetic aperture radar (SAR) phase history pixel data, comprising the steps of:

providing unfocused SAR complex inphase and quadrature digital data defining individual pixels, simultaneously compressing and converting said inphase and quadrature digital data into scalar log amplitude data and phase data defining individual pixels, converting a plurality of said scalar log amplitude data pixels into combined log amplitude vector data and converting a plurality of said phase data pixel information into combined phase vector data defining a plurality of data pixels, and simultaneously compressing and converting said combined vector data to provide compressed encoded data representative of said uncoded complex inphase and quadrature phase history data.

2. A method of compressing unfocused SAR phase history data as set forth in claim 1 wherein the step of simultaneously compressing and converting said inphase and quadrature digital data comprises reading information out of a look-up table.

3. A method of compressing unfocused SAR phase history data as set forth in claim 1 wherein said inphase and quadrature digital data comprises an address for said look-up table.

4. A method of compressing unfocused SAR phase history data as set forth in claim 3 wherein the step of simultaneously compressing and converting said combined vector data comprises reading information out of a second look-up table.

5. A method of compressing unfocused SAR phase history data as set forth in claim 4, wherein said combined vector data comprises an address for said second look-up table.

6. Apparatus for compressing and decompressing unfocused synthetic aperture radar (SAR) phase history pixel data, comprising:

an SAR for generating complex inphase phase history data having real and imaginary components, first converter/compressor means coupled to said SAR for producing compressed scalar log amplitude and scalar phase pixel data, means for converting plural scalar pixel data into vector data representative of a plurality of pixels, and second converter/compressor means coupled to said means for converting plural scalar pixel data to provide compressed encoded data representative of a plurality of pixels of unfocused SAR phase history data.

7. Apparatus for compressing and decompressing data as set forth in claim 6 which further includes means for transmitting said unfocused compressed SAR phase history data.

8. Apparatus for compressing and decompressing data as set forth in claim 7 which further includes means for for receiving said transmitted unfocused SAR phase history data.

9. Apparatus for compressing and decompressing data as set forth in claim 8 which further includes means for decompressing and converting unfocused compressed SAR phase history data.

10. Apparatus for compressing and decompressing data as set forth in claim 9 wherein said means for decompressing and converting phase history data comprises a look-up table.

11. Apparatus for compressing and decompressing data as set forth in claim 10 wherein the said ratio of inputs to outputs in said look-up table comprises a ratio of one to four.

12. Apparatus for compressing and decompressing data as set forth in claim 6 wherein said first converter/compressor means comprises a look-up table.

13. Apparatus for compressing and decompressing data as set forth in claim 12 wherein the ratio of inputs to outputs in said look-up table comprises a ratio of three to two.

14. Apparatus for compressing and decompressing data as set forth in claim 6 wherein said second converter/compressor means comprises a second look-up table.

15. Apparatus for compressing and decompressing data as set forth in claim 14 wherein the ratio of inputs to outputs in said second look-up table comprises a ratio of eight to three.

16. Apparatus for compressing and decompressing data as set forth in claim 6 wherein said means for converting plural scalar pixel data into vector data comprises a plurality of shift registers connected between said first converter/compressor and said second converter/compressor.

17. Apparatus for compressing and decompressing data as set forth in claim 6 wherein said means for converting plural scalar pixel data into vector data comprises series to parallel data conversion means.

18. Apparatus for compressing and decompressing data as set forth in claim 17 which further includes clock means coupled to said series to parallel data compression means.

* * * * *